United States Patent [19]  [11] 3,861,984
Poulsen  [45] Jan. 21, 1975

[54] MANDREL FOR THE PRODUCTION OF REINFORCED PLASTIC TUBING

[75] Inventor: Peder Ulrik Poulsen, Fredensborg, Denmark

[73] Assignee: Owens-Corning Fiberglass Corporation, Toledo, Ohio

[22] Filed: July 13, 1972

[21] Appl. No.: 271,309

[30] Foreign Application Priority Data
Nov. 2, 1971  Denmark............................. 5344/71

[52] U.S. Cl.................. 156/425, 156/429, 156/443
[51] Int. Cl............................................ B32b 31/00
[58] Field of Search.................... 156/171, 173–175, 156/443, 446, 425, 428, 431, 189, 195; 93/80, 94; 242/2, 7.21, 7.22; 29/477, 477.3

[56] References Cited
UNITED STATES PATENTS

| 2,398,876 | 4/1946 | Bailey | 156/195 X |
| 2,625,979 | 1/1953 | Harris et al. | 156/436 X |
| 3,192,088 | 6/1965 | Lariviere | 156/171 X |
| 3,380,147 | 4/1968 | McDonald | 29/477.3 X |
| 3,655,489 | 5/1969 | Poulsen | 156/429 |
| 3,658,625 | 1/1970 | Ishikawa et al. | 156/429 |

FOREIGN PATENTS OR APPLICATIONS
541,769  10/1968  Japan

Primary Examiner—Charles E. Van Horn
Assistant Examiner—David A. Simmons
Attorney, Agent, or Firm—Carl G. Staelin; John W. Overman; John M. Lorenzen

[57] ABSTRACT

The invention is continuous working mandrel for the production of tubing, especially fiber reinforced plastic tubing, and is particularly suited for the on-site production of large diameter vertical tank shells. An endless metal strip is helically wound around a hollow cylindrical core and extends back through the center of the core to provide a continuously advancing and recirculating mandrel surface on which the plastic tubing is formed. In one embodiment the core comprises a plurality of synchronously driven, circumferentially spaced, parallel rollers which continually circulate the endless strip about the core. The support rollers are provided with a plurality of grooves spaced to correspond to the helical path of the endless strip. One edge of the roller grooves cooperates with stiffening means extending the entire length of the endless strip to guide the strip and to provide support in the axial direction for each convolution of the strip.

13 Claims, 7 Drawing Figures

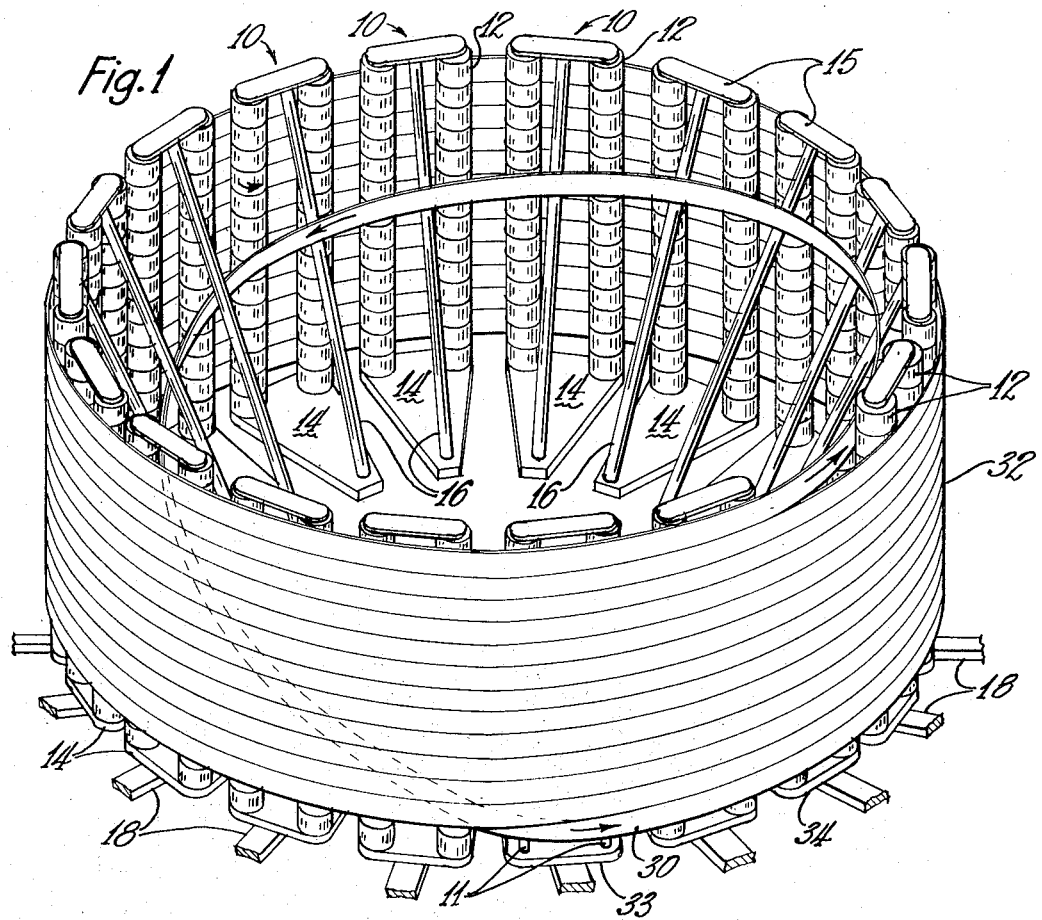
Fig.1
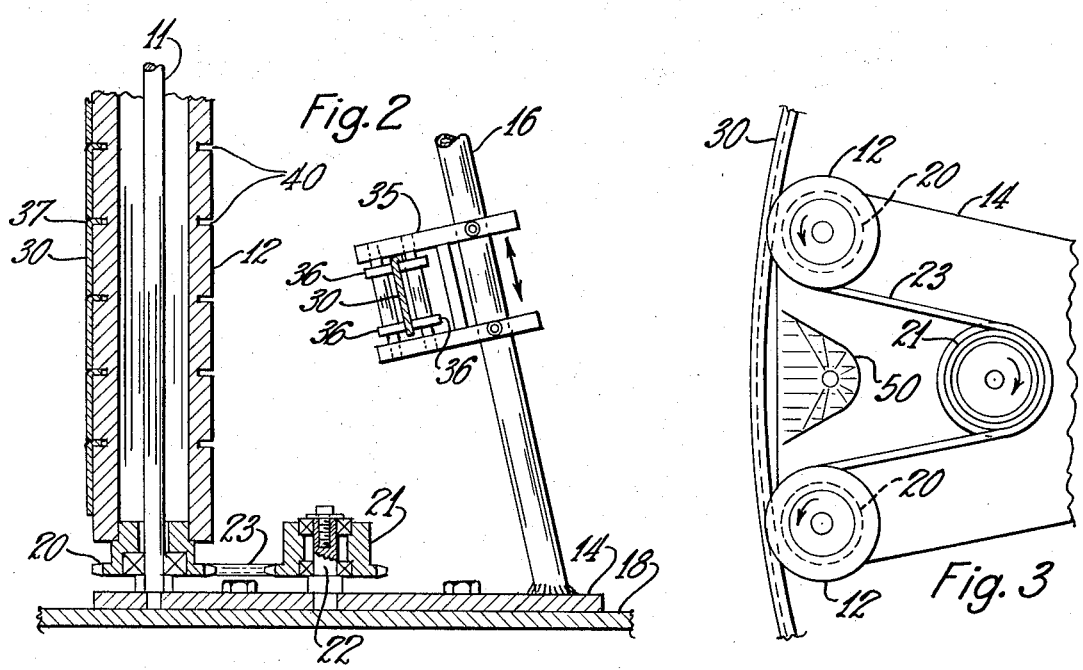
Fig.2
Fig.3

MANDREL FOR THE PRODUCTION OF REINFORCED PLASTIC TUBING

INTRODUCTION

This invention relates generally to driven mandrels suitable for the continuous production of tubing of indefinite length. The mandrel of this invention is particularly well suited for the production of fiber reinforced plastic tubing, and still more particularly, for the on-site production of tubular plastic shells for large diameter vertical storage tanks.

Continuous working mandrels, i.e., mandrels supported from one end and having a surface continuously advancing toward the free end thereof, are well known in the art. Such mandrels have become increasingly popular for the production of continuous tubing from materials not particularly suited for extrusion, pultrusion, or other continuous processes.

Continuous working mandrels find increasing use in the manufacture of tubular shapes of fiber reinforced plastics used for pipe, tank shells, etc. Such items are made by applying liquid resin and fibers to the working surface of the mandrels by any of several conventional techniques including spraying, hand lay-up, and filament winding. Since the mandrel surface continually advances toward the free end, the tubular form is continuously advanced until free of the mandrel. When the tubing is set to a handleable state it is cut to the desired length.

In one well known design of a continuous working mandrel, the working surface is formed by an endless flexible strip which is helically wound on and supported by a tubular core having a free end. The endless strip is continuously and helically wound in a plurality of close spaced convolutions advancing toward the free end of the core, and then carried back through the mandrel core to the point where the winding began.

The mandrel core may be either a unitary tubular body or a plurality of rails or longitudinal members extending from a common mount. The latter construction offers the advantage of being adjustable in diameter. In this latter construction the longitudinal supports are spaced around the periphery of the tubular core and aligned parallel to the mandrel axis.

In the prior art mandrels of the type described, the core rotates and the strip is wound and advanced by the frictional pull of the rotating core. Thus whether the core is a unitary body, or a structure of rails, it must support the endless strip by means which provide a sufficient frictional pulling force in the tangential direction while allowing free longitudinal movement of the strip.

In one version of the prior art mandrels, the tubular core is provided with endless driven support belts or chains as the means for winding and advancing the endless strip. Such a mandrel is shown and more fully in U.S. Pat. No. 3,004,585. It is a drawback of this version that the necessary large number of driven belts or chains requires a rather complicated and expensive drive mechanism. Furthermore, during the operation a considerable friction develops between the side edges of the support belt and the sidewalls of the groove guiding the belt, or between the groove bottom and the support belt, which friction impedes the free movement of the strip convolutions toward the free core end.

In another well known version of the above described mandrel, as described in U.S. Pat. No. 3,464,879, the rails of the mandrel core structure are provided with a large number of recirculating balls riding in grooves in the rails. In another version of the same mandrel, roller bearings are substituted for the recirculating balls. The endless strip is supported on these rollers or balls. The strip convolutions are advanced toward the free end of the mandrel by means of a cam mechanism acting against the edge of the starting convolution.

Because each convolution is urged forward by the pressure of the next following convolution, it is a characteristic of this mandrel version that all convolutions are in close edge to edge relationship forming a smooth mandrel surface on which to form the plastic tubing. However, in spite of the friction reducing effect of the rollers or balls, a considerable pressure often appears between two strip convolutions. This pressure frequently causes the edges of adjacent convolutions to slip against each other resulting in an overlapping. This condition requires immediate action and can only be remedied by stopping the entire process, and unwinding and rewinding the convolutions in question. The likelihood of this condition occurring is increased when the mandrel is disposed vertically and the weight of the tubular article adds to the pressure between adjacent convolutions.

It is a principal object of the present invention to provide a continuous working mandrel for the production of reinforced plastic tubing which overcomes the drawbacks of the prior art mandrels as described above.

It is a further object of the invention to provide a continuous working mandrel having an endless strip helically wound to form a working surface, in which each convolution of the strip is supported in the direction of the mandrel axis, which mandrel is therefore better suited for making tubing on a vertical axis.

It is a still further object of this invention to provide a continuous working mandrel of a design that is sufficiently simple in construction to allow easy dismantling and reassembly for on-site production of vertically standing tanks and silos having diameters of 30–40 feet or more.

These and other objects are achieved by the mandrel of my invention which comprises a hollow core mounted at one end; an endless strip wound helically around and back through the core to form a working surface; means on the core for providing support in the direction of the axis of the helix for each convolution of the strip, and means for continuously advancing the strip relative to the core.

In one embodiment of my invention the core or frame is comprised of a plurality of rollers spaced peripherally around an imaginary cylinder and extending parallel to the axis of the mandrel. It is preferred that the mandrel be designed so the support rollers can be easily shifted radially, and the strip length adjusted accordingly, to allow adjustment of the mandrel diameter over the range of the machine.

Like the support rails of the above described prior art mandrels, the rollers are evenly spaced from each other a peripheral distance determined by the rigidity of the winding strip. However, unlike the prior art mandrels, the core frame of this mandrel is not rotated to advance the endless strip. Rather only the skin formed by the strip convolutions is rotated by means of the synchronously driven rollers.

It is a feature of the present invention that a product made on a mandrel of the invention will always be cylindrical regardless of possible defects of the mandrel shape. In the mandrels of the prior art irregularities of the mandrel shape due to flattening or deviations in the radial positions of the support beams will appear in the finished product.

Despite this last mentioned feature, in a mandrel of the type described it is desirable that the mandrel surface remain cylindrical within reasonably close tolerances regardless of the tension in the strip. Otherwise a local flattening caused by the distance between adjacent stationary support rollers will result in a constant flexing of the product every time the respective point of the mandrel skin passes over those support rollers. Experience has shown that flexing of the curing laminate may result in reduced strength of the finished product.

Excessive flattening of the mandrel skin in the areas between support lines is avoided according to the invention by providing the tape with stiffening means along its entire length. In the one embodiment of the invention, described in greater detail below, the stiffening means comprises a right angle bend along one edge of the band. The width of the bend is determined to obtain the maximum stiffness without exceeding the limit of elastic deformation of the tape at its passage over the support rollers and guide means for the return convolutions. However, it is appreciated that the stiffening means could be provided in numerous ways including welding a separate rib or profile member to the entire length of the strip, putting a folded seam along the length of the strip, or otherwise putting a sharp change in profile across the width of the band.

Further in accordance with the invention, the stiffening means is also used to guide and provide axial support for the strip. To this end the mandrel core is provided with support means disposed along the helical path of the band, which support co-operates with the stiffening means.

In the specific embodiment shown, the support means comprises a plurality of circular grooves spaced along the length of each support roller and spaced from one support roller to the next in accordance with the helical winding path of the strip. The grooves are shaped to accept the right angle bend along one edge of the tape, or other stiffening means, whereby axial movement of the convolutions with respect to the support rollers is rendered impossible. Thus the mandrel is capable of taking loading in the axial direction without danger of the windings overlapping. Accordingly, the mandrel of the present invention is particularly suited for use on a vertical axis as well as any other axis.

It is advantageous to operate a mandrel of the type and size described on a vertical axis since this eliminates the imposition of bending loads and the resulting deflection of the mandrel. When the mandrel is operated vertically, the product rises gradually upward until the desired length is reached whereafter it is cut off and removed from the mandrel.

The invention will now be described in greater detail with reference to the accompanying drawings of which:

FIG. 1 shows an embodiment of vertically oriented continuous working mandrel according to the invention;

FIG. 2 is a sectional view of one of the support units of the mandrel of FIG. 1 taken along the line 2—2 in FIG. 1;

FIG. 3 is also a sectional view of one of the support units of the mandrel of FIG. 1 taken along the line 3—3 in FIG. 1;

Figure 4:
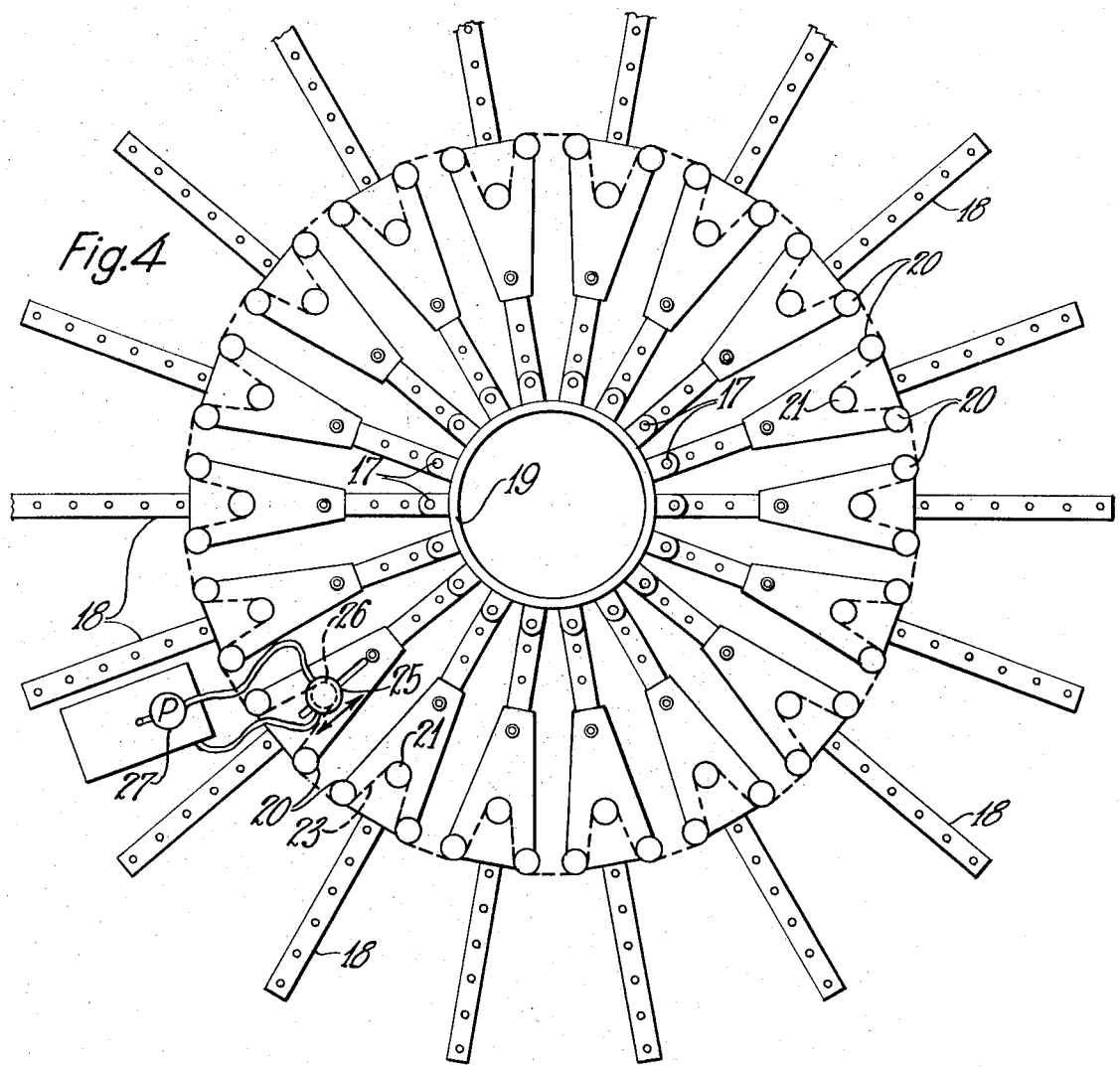
FIG. 4 is a plan view of the mandrel of FIG. 1 seen from above and emphasizing the drive arrangement.

FIG. 1 illustrates the arrangement of the main components of a mandrel embodying the invention. The frame of the mandrel comprises a number of nearly identical support units 10 arranged evenly spaced along the inner periphery of a circle whose diameter is equal to the internal diameter of the product to be made. Each unit is provided with two rollers 12, which are rotatably mounted on shafts 11 which in turn are mounted in a fixed position and extend vertically upward from a common base plate 14. The top ends of the shafts 11 are held in position by a connecting plate 15. A truss member 16 connects the connecting plate 15 with the support unit base plate 14 to form a triangular structure capable of resisting large radial forces without excessive deflection.

As shown in FIGS. 1 and 2, the support units 10 can be each adjustably mounted on a radially extending beam or spoke 18. By providing for either the continuous or incremental adjustment of support units 1 along the beam 18, the mandrel diameter can be varied. The radial adjustment of the units can be provided by any well known means including lead screws, slides, or a series of spaced holes for attachment of the support units. Of course, where the capacity to adjust the mandrel diameter is not necessary, the support units can be fixably mounted on a common base.

Referring to FIG. 4, the beams 18 are pivotably mounted on a common central ring 19, and extend therefrom like the spokes of a wheel. The beam may be swung together by turning them about the pivot points 17, or taken off if desired. Thereby the mandrel can be folded together into a narrow shape for road transportation after disassembly of the endless strip 30, the drive chain 23, and some of the support units.

Shown in FIGS. 2, 3, and 4 is a simple embodiment of a drive arrangement for the mandrel of FIG. 1. On each support roller 12 is mounted a sprocket wheel 20. In a fixed position on the base plate 14 of each support unit is mounted a third sprocket wheel 21 which is rotatable about a shaft 22. A roller chain 23 is guided around the sprockets as shown in FIGS. 3 and 4. The proper chain tension is maintained by means of one radially moveable tightening wheel 25 mounted on the shaft of a hydraulic motor 26. A variable output pump unit 27 feeds the motor 26 to cause the syncronous rotation of all support rollers with a speed that is variable between zero and maximum. Accordingly with this drive arrangment, when the mandrel diameter is changed it is only necessary to adjust the length of the roller chain 23.

Although suitable, the drive system described above is merely exemplary of many systems that could be readily designed by one skilled in the art using well known power means and transmission components. It is understood that these other drive systems are within the scope of the invention as herein described.

Referring again to FIG. 1, the mandrel surface 32 is formed by a series of convolutions of a continous strip. As used herein the terms strip, tape, or band are used interchangeably to mean a thin metal sheet which is relatively narrow in proportion to its length. The width and thickness of the strip 30, which is of a flexible but strong material, preferably steel, are determined by factors related to the particular application, including primarily the mandrel diameter.

The strip 30 is wound onto the mandrel core starting at the unit 33 and helically wrapped upward to form the mandrel surface. The strip is then taken off toward the center at the unit 34 and forms a reverse helix back through the center of the core. The strip continues out near the support unit 33 where it is welded to the first convolution to form an endless strip.

To facilitate the wrapping arrangement described the support unit 34 is lower than the others thereby allowing the strip 30 to be guided above the others as it begins its return loop. Similarly, the support unit 33 is reduced in diameter in order to avoid excessive bending of the strip 30 at this point.

On its way back and down the return convolutions, the strip 30 passes closely by all truss members 16 and through individual guide units 35 provided with rollers 36. The guide units 35 are spaced along the respective truss members in accordance with the correct path of the strip. Proper tensioning of the endless strip is accomplished by shifting all or part of the guide units 35 upwards along the sloping truss members whereby the return convolution is given a larger diameter.

In the operation of the mandrel described, the drive unit, as shown in FIG. 4, provides for the synchronous rotation of all the support rollers 12. The support rollers in turn cause the continuous circulation of the helically wound strip 30, thereby providing a continous working surface 32 on which the product is formed by any well known technique.

Figure 5:
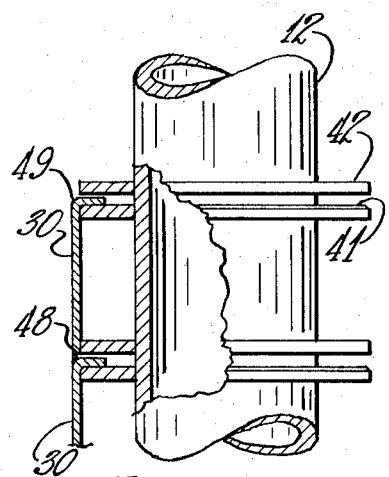
FIG. 5 is an enlarged view of a support roller, partly in section, with a section through an embodiment of the tape and support roller according to the invention.

When the mandrel described here is operated at or near its maximum diameter, the distance between support rollers is necessarily at a maximum also. Therefore, in order to prevent flat spots in the mandrel surface between support rollers, provision must be made for the proper stiffness of the strip 30. To this end it has been formed particularly suitable to provide a right angle bend along one entire edge of the band as shown in FIGS. 2 and 5. The depth of the bend, like the thickness of the band, is determined by the amount of bending which the strip must endure.

Figure 6:
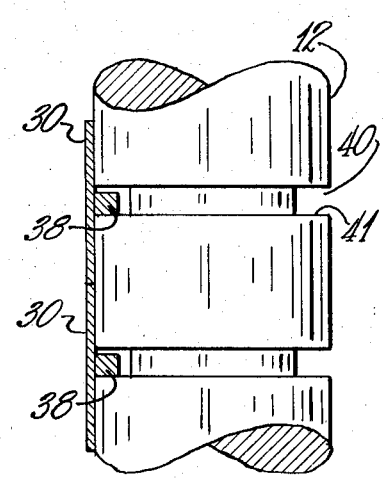
FIG. 6 is the same view as shown in FIG. 5 but showing a section through another embodiment of a tape according to the invention.

Although the right angle bend 37 is one suitable means for stiffening the strip 30, other means will occur to those skilled in the art and are included within the contemplation of the invention. One of these other stiffening means is shown in FIG. 6 wherein the strip is provided with a narrower strip 38 welded to the back of the strip along its centerline. A similar stiffening means could be provided by forming a lateral fold in the strip along its length.

As mentioned earlier, one particular feature of the present invention making it preferable over the prior art mandrels resides in the provision of support in the axial direction for the windings of the strip 30. To this end all the support rollers 12 are provided with a number of circular grooves 40 spaced in accordance with the mandrel pitch. The grooves in each roller are axially displaced with respect to the corresponding grooves in an adjacent support roller so that the accumulated displacement over the entire circumference is equal to the winding pitch.

Figure 7:
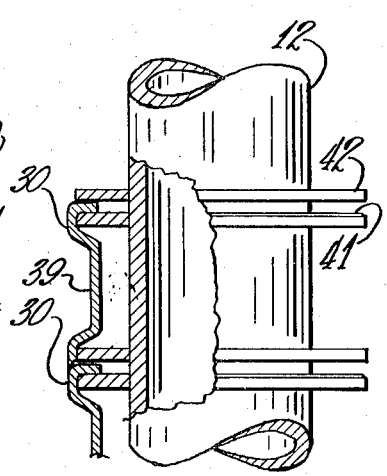
FIG. 7 is the same view as shown in FIGS. 5 and 6 but showing a section through still another embodiment of a tape according to the invention.

The grooves 40, as shown in FIG. 6 are adapted to receive the stiffening means on the endless strip 30. The lowermost edge of the groove then provides a support ledge 41 on which the stiffening means rides. As an alternative to the grooves 40, shown in FIGS. 5 and 7, the axial support ledge 41 may be provided by a series of spaced flanges 42 as shown in FIGS. 5 and 7. Still other methods of providing for the axial support of the convolutions of the strip 30 will occur to those skilled in the art.

Referring again to FIG. 5, it is obvious that it is not essential to the construction of a mandrel according to the invention that the strip be wound with the individual convolutions in close edge to edge relationship. This is true since all axial loading on the mandrel is transmitted to the support rollers, via the support means, by the stiffening means on the strip. Actually it would be difficult to obtain a completely closed mandrel surface by the arrangement shown in FIGS. 1 and 2 because there will always be a gap between the convolutions equal to the manufacturing tolerances of the strip. However this can be remedied according to the invention by giving the edge of the strip a taper 48 as shown in FIG. 5, which taper fills out approximately the radius 49 formed by the bend on the opposite edge of the strip. By this measure a smooth and tight mandrel surface is obtained. In addition the convolutions of the mandrel surface are capable of taking up a considerable local radial force without impression because the pressure is now transferred to the adjacent strip convolutions.

In the embodiment of the inventon illustrated by FIG. 7, the strip 30 has been given a corrugation 39 along its entire length in addition to the profiled edge mentioned above. This additional feature will result in products having a helically corrugated well giving an improved rigidity against radial deformation at a low material consumption.

In FIG. 7, the diameter of the support rollers 12 has been reduced between the grooves 40 in order to save weight and accomodate the corrugation in the strip. When determining the possible depth of the corrugation it is necessary to again consider the degree of curvature of the mandrel wall and bending of the strip when passing over guides and support rollers. However, it is noted, for the larger diameters where a deep corrugation is required for maximum regidity of products there is less bending of the strip, and accordingly a deeper corrugation is rendered possible.

An additional modification to the basic invention is shown in FIG. 3 wherein means for internally heating the mandrel to accelerate the cure of the tubing are provided. Specifically, radiation heaters, or other thermal energy sources 50 are disposed along the entire length of each support unit. Of course it is also within the inventive concept here, that where desired, the mandrel can be used in combination with external heat sources.

In the preceding discussion of the invention the core of the mandrel is described as being stationary. By this it is meant that the core does not rotate along with the mandrel surface. Unlike the prior art mandrels the endless band moves relative to the core in both the circumferential and axial directions. Thus it is understood that where the core is also fixed to the environment, the tubing being formed must necessarily rotate with respect to the environment.

In the alternative, it is conceivable that there are applications where it would be undesirable for the product to rotate. This can be remedied within the scope of the invention, by providing for rotation of the mandrel core at the same speed but in the opposite circumferential direction as the moving strip. The result is a mandrel surface having only longitudinal movement with respect to the environment. Such a mandrel would be suited for use with such material feed means as a planetary winder or a concentric extruder to produce continuous piping which can be simultaneously laid in a trench, etc.

Having thus described the invention, other variations, adaptations, modifications, and arrangments may occur to those skilled in the art to which the invention relates.

I claim:

1. A mandrel for the production of tubing, comprising:
    a hollow core supported at one of its ends;
    an endless strip wound helically around said core in the direction from the supported end of the core toward the other end and extending back through the interior of the core to the supported end, the successive convolutions of the helically wound strip forming a surface upon which the tubing is formed;
    means depending from the inner surface of the endless strip along its length co-operatively engaging support means on the core in a manner effective to provide support for each convolution of the strip in the axial direction of the forming surface; and
    means for advancing the endless strip relative to the core.

2. A mandrel as recited in claim 1, wherein the core is generally cylindrical and comprises a plurality of rollers disposed equidistantly about and parallel to the axis of the forming surface.

3. A mandrel as recited in claim 2, including means for rotating at least one of the rollers to advance the endless strip.

4. A mandrel as recited in claim 3, wherein all the rollers are rotated synchronously.

5. A mandrel as recited in claim 1, wherein the depending means comprises a lateral fold in the strip along its entire length.

6. A mandrel as recited in claim 5, wherein the depending means comprises a right angle bend along one edge of the endless strip.

7. A mandrel as recited in claim 6, wherein the edge of the endless strip opposite to the edge having the right angle bend is provided with a contour adapted to mate with the radius formed at the right angle bend whereby the space between adjacent convolutions of the strip can be minimized.

8. A mandrel as recited in claim 1, wherein the depending means comprises a narrower endless strip attached along the entire length of the first endless strip.

9. A mandrel as recited in claim 1, wherein the support means on the core comprises a radially extending ledge disposed about the outer periphery of the core according to the helical path of the endless strip.

10. A mandrel as recited in claim 1, wherein the core comprises a plurality of spaced parallel rollers disposed equidistantly about the axis of the forming surface.

11. A mandrel as recited in claim 10, wherein said depending means is further effective to stiffen the endless strip sufficiently to maintain smooth curvature of the strip even across the space between adjacent rollers.

12. A mandrel as recited in claim 10, wherein the support means on the core comprises a plurality of circumferential grooves spaced along the length of each roller, the grooves in each roller being displaced from the corresponding grooves in adjacent rollers according to the helical path of the endless strip, the grooves further being adapted to co-operatively engage the depending means on the endless strip to provide support in the axial direction of the forming surface for the convolutions of the endless strip.

13. A mandrel as recited in claim 1, wherein the endless strip is provided with a longitudinal corrugation extending the entire length of the strip to form a helical impression in the mandrel surface.

* * * * *